W. J. STILLMAN.
Sight for Fire-Arms.
No. { 2,961, 33,965 }
Patented Dec. 17, 1861.
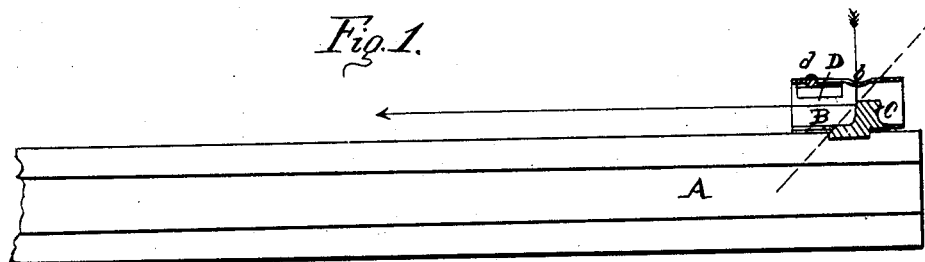
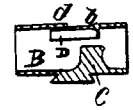
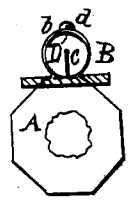
Witnesses:
Thomas D. Stetson
D. W. Stetson
Inventor:
W. Stillman

UNITED STATES PATENT OFFICE.

WM. J. STILLMAN, UNITED STATES CONSUL AT ROME, ITALY.

IMPROVEMENT IN RIFLE-SIGHTS.

Specification forming part of Letters Patent No. 33,965, dated December 17, 1861.

*To all whom it may concern:*

Be it known that I, WILLIAM JAMES STILLMAN, United States Consul at Rome, Italy, have invented certain new and useful Improvements in Rifle-Sights; and I do hereby declare that the following is a full and exact description of the same, reference being had to the accompanying drawings, in which—

Figure 1 is a vertical longitudinal section of my improved sight affixed to a rifle-barrel and adjusted for use as a bright sight. Fig. 2 is a cross-section of the same; and Fig. 3 is a section similar to Fig. 1, with the sight adjusted for use as a dark sight.

It is well known to all who have practiced rifle-shooting, particularly in woods and other dark places, that it is very difficult to see the covered sight in ordinary use in aiming at any dark object, while the open sight is objectionable, because of the aim varying materially with the different directions from which the light falls upon the sight and is reflected to the eye.

The nature of my invention consists in the employment of a sight having a reflecting-surface placed at such an angle as to reflect to the eye light from one direction only, so that from whatever direction the light may fall upon it none will reach the eye except that from one certain direction, and this always coming at the same angle prevents any variation in the aim from that cause.

The nature of my invention consists also in the use of a reflecting-sight, in combination with an adjustable covering or protection so arranged as to be opened or closed at will, whereby the sight may be made either a bright one or a perfectly black one, as the circumstances may require.

In the drawings, A is a rifle-barrel; and B, a short tube affixed thereto, containing and protecting the sight C from injury in the ordinary manner. The end of C farthest from the muzzle, and consequently nearest the eye of the rifleman, I form into a plane standing at an angle of about forty-five degrees, so as to reflect the light from above directly to the eye, as shown by the red lines in Fig. 1. This plane is burnished and plated with silver or platinum, so as to always present a bright reflecting-surface. It may be covered with enamel or protected from tarnishing by any other means desired. In the tube B, I make an opening, *b*, in such a position that the light, or a portion thereof which passes through such opening, will so fall upon the reflecting-surface of C as to be reflected in the line of sight. I also provide a slide, D, blacked on its under face, which may be made to close the opening *b* at will by simply slipping it along by means of the knob *d*. When *b* is open, the diffused light from the sky or from foliage, rocks, or other reflecting-surface above is reflected upon C, and it forms a very bright sight, which can be readily seen in dark woods, or even late in the evening, or against any dark object—circumstances in which the ordinary sight would be nearly or quite useless. When the opening *b* is closed by the blackened slide D, the under side of which is so prepared by smoking or otherwise as to be almost perfectly absorbent of light, no light can, under any circumstances, be reflected from C in the line of sight, and it therefore presents a perfectly black surface, which is the most favorable condition for being distinctly seen against a light or neutral ground. With the ordinary sight, on the contrary, enough light is reflected to the eye to render the sight of a tint which is difficult to distinguish even against a neutral ground.

It will be observed that my improved sight may be used either as a bright sight, in which case it forms a brilliant point, or as a black covered sight, in which case it is perfectly black, and the change from one condition to the other may be made instantly at will by simply sliding the piece D so as to open or close the hole *b*. I do not limit myself, however, to the sliding piece D, as various other means may be employed to control the admission of light in the proper direction to the sight C. It may also be desirable, especially for night shooting, to have the reflecting-surface of C stand at a different plane from that represented, and to have the opening *b* so arranged that an artificial light at the side, or nearly at the rear, or in any other desired position will be reflected in the line of sight.

Having now fully described my invention, what I claim is—

1. The employment, in rifled or other fire-arms, of a reflecting-sight, C, so constructed and arranged as to reflect in the line of sight light from a given direction only, substantially as and for the purpose herein set forth.

2. In combination with a reflecting-surface, C, an adjustable covering or protector, B D, so arranged as to admit of being opened or closed at pleasure, for the purpose above specified.

W. J. STILLMAN.

Witnesses:
   THOMAS D. STETSON,
   D. W. STETSON.